US 6,655,697 B2

(12) United States Patent
Héraud et al.

(10) Patent No.: US 6,655,697 B2
(45) Date of Patent: Dec. 2, 2003

(54) PISTON OIL RING HAVING LAND FLANKED BY CONCAVE SIDEWALLS

(75) Inventors: Stephane Héraud, Paris (FR); William Spengler, Triel sur Seine (FR)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 10/051,799

(22) Filed: Jan. 18, 2002

(65) Prior Publication Data

US 2002/0070507 A1 Jun. 13, 2002

(51) Int. Cl.$^7$ ................ F02F 5/00; F16J 9/06
(52) U.S. Cl. ............ 277/484; 277/472; 277/477; 277/485; 277/491
(58) Field of Search ................ 277/484, 485, 277/491, 434, 467, 472, 470, 476, 477

(56) References Cited

U.S. PATENT DOCUMENTS

| 345,767 | A | * | 7/1886 | Buckley ............... 277/485 |
| 2,224,338 | A | | 12/1940 | Bowers |
| 2,311,728 | A | | 2/1943 | Bowers |
| 2,334,243 | A | * | 11/1943 | Bowers ............... 29/888.076 |
| 2,764,458 | A | * | 9/1956 | Ward et al. ............ 277/463 |
| 2,905,512 | A | * | 9/1959 | Anderson ............ 277/442 |
| 3,026,219 | A | * | 3/1962 | Hamm ............... 277/463 |
| 3,191,946 | A | * | 6/1965 | Hamm ............... 277/475 |
| 3,206,219 | A | | 9/1965 | Hamm |
| 3,653,670 | A | * | 4/1972 | Sifri et al. ............ 277/438 |
| 3,683,477 | A | * | 8/1972 | Sugahara ............ 277/481 |
| 3,752,490 | A | | 8/1973 | Geffroy |
| 3,921,988 | A | * | 11/1975 | Prasse et al. ........... 277/467 |
| 4,045,036 | A | | 8/1977 | Shunta ............... 277/476 |
| 4,079,949 | A | | 3/1978 | McCormick |
| 4,099,730 | A | * | 7/1978 | Nisper ............... 277/484 |
| 4,139,205 | A | | 2/1979 | Duck et al. |
| 4,497,497 | A | | 2/1985 | Berti et al. |
| 5,265,890 | A | * | 11/1993 | Balsells ............... 277/467 |
| 5,603,512 | A | * | 2/1997 | Lawrence et al. ....... 277/467 |

FOREIGN PATENT DOCUMENTS

| DE | 1627782 | 6/1967 |
| DE | 2649470 | 5/1978 |
| DE | 2711018 | 5/1978 |
| DE | 19704754 | 6/1998 |
| FR | 1493675 | 7/1966 |
| FR | 1493704 | 7/1966 |
| FR | 1493705 | 7/1966 |
| FR | 77 32268 | 10/1977 |
| FR | 77 32269 | 10/1977 |
| GB | 1170865 | 11/1969 |
| GB | 1593584 | 7/1981 |

* cited by examiner

Primary Examiner—Anthony Knight
Assistant Examiner—Christopher Bowell
(74) Attorney, Agent, or Firm—Rader, Fishman & Grauer PLLC

(57) ABSTRACT

An oil control ring for a piston of an internal combustion engine has an annular body defining a central axis. The ring has a U-shaped cross-section formed of a centrally positioned web extending parallel to the axis and a pair of axially spaced rail portions integrally connected to the web. Each rail portion extends radially outwardly with respect to the web, and an extremity of each rail portion defines a land extending parallel to the axis and adapted to sealingly engage a cylinder wall. Each land defines a pair of spaced chamfered sidewalls. Each sidewall extends contiguously from each land to define a chamfered edge adjacent the land. Finally, each chamfered edge defines a concave annular sidewall. The result is a reduction of land surface area in contact with the cylinder walls of an engine to provide improved performance, particularly during the engine break-in period.

14 Claims, 2 Drawing Sheets

PISTON OIL RING HAVING LAND FLANKED BY CONCAVE SIDEWALLS

BACKGROUND OF THE INVENTION

1. Field of the Invention

This invention relates to piston rings employed in pistons of internal combustion engines, and more particularly to design enhancements of oil control piston rings employed in such pistons.

2. Description of the Prior Art

Those skilled in the art will appreciate that the pistons of internal combustion engines in today's modern vehicles are generally provided with three sets of piston rings for minimizing, between the pistons and their associated cylinder bores, the leakage of combustion gases to the engine crankcase, or of oil vapors to the combustion chamber.

A compression ring is generally provided in an upper region of a piston and is one hundred percent dedicated to operate as a gas-sealing medium, so as to prevent entry of combustion gases into the engine crankcase. A so-called lower compression ring is generally provided in a medial region of the piston body, providing approximately forty percent of the noted gas sealing function and sixty percent of an oil scrapping function. The lower compression ring is generally effective to prevent oil vapors from traveling up to the top of the piston head to create the classic smoking tailpipe or "blue smoke" syndrome.

Finally, most modern pistons include a third piston ring called a lower or "bottom" oil control ring designed one hundred percent for aggressive scrapping of oil, and that is particularly adapted to force the oil back into the crankcase. Normally the oil control ring is the bottom-most piston ring, and in many modern engines constitutes a U-shaped flexible multidimensional ring. Accordingly, the ring includes a medial web supporting two spaced rail portions integrally connected to the web.

It will thus be appreciated that various piston rings are designed to address either or both of the noted functions of prevention of leakage of gas to the crankcase, or of oil to the piston head. Generally, as the rings wear during their continuous scrapping against the cylinder walls and associated rocking within piston ring grooves, issues of blow-by of gases into the crankcase, and oil leakage into combustion chamber areas, become significant. Most rings incorporate an initial tangential tension in their structures (as measured by a spring band) against the cylinder walls. This initial force, however, tends to diminish during the useful life of the piston ring.

Although substantially improved over the past decade, piston rings of modern engines remain deficient in various other respects as well. For example, in spite of the valuable scrapper function performed by the bottom oil control ring, an improved oil ring compression control against the cylinder walls during the engine break-in period for enhancing performance during said period would be quite desirable.

SUMMARY OF THE INVENTION

The present invention provides a mechanism for optimizing radial pressure of a piston oil control ring against the cylinder wall of a cylinder bore during the break-in period of an engine. An oil control ring for a piston of an internal combustion engine has an annular body defining a central axis. The ring has a U-shaped cross-section formed of a centrally positioned web extending parallel to the axis, and a pair of axially spaced rail portions integrally connected to the web. Each rail portion extends radially outwardly with respect to the web, and an extremity of each rail portion defines a land extending parallel to the axis and adapted to sealingly engage a cylinder wall.

Each land defines a pair of spaced concave annular sidewalls. Each sidewall extends contiguously from each land. The concave surface of each sidewall results in a reduction of land surface area in contact with the cylinder walls of an engine at any point during the engine break-in period. An improved performance, particularly during the engine break-in period, is realized through lower oil consumption and increased fuel economy.

DETAILED DESCRIPTION OF THE PREFERRED EMBODIMENTS

Figure 1:
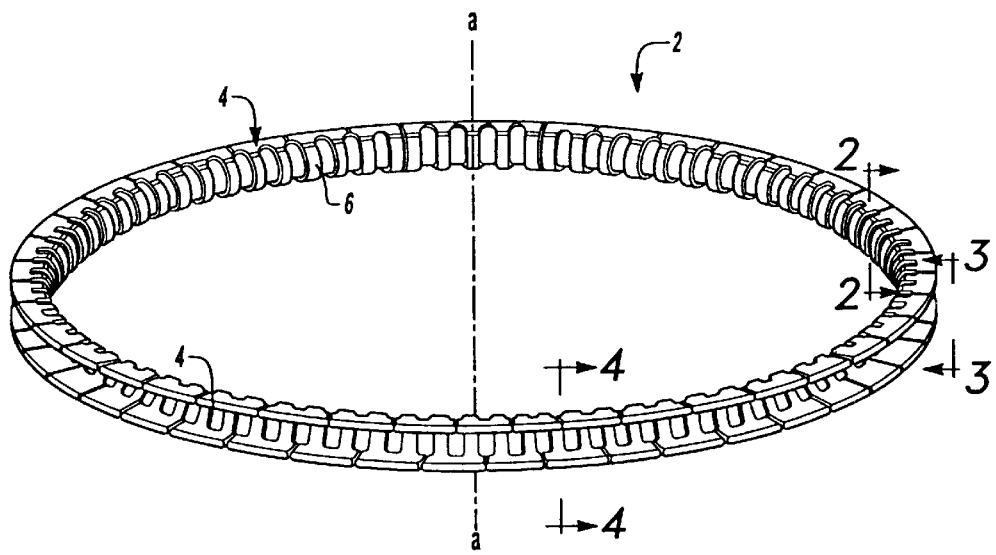
FIG. 1 is a perspective view of a piston ring that incorporates the improved engine break-in oil control feature of the present invention.
Figure 2:
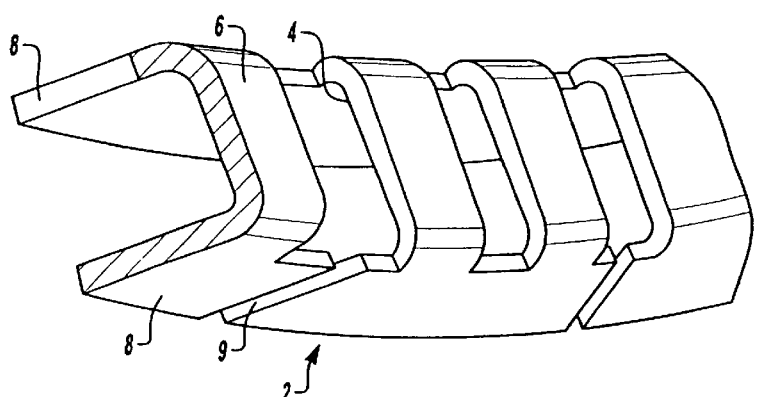
FIG. 2 is an enlarged view along lines 2—2 of inset A of FIG. 1, revealing details of an interior portion of one presently preferred embodiment of the oil control piston ring of this invention.
Figure 3:
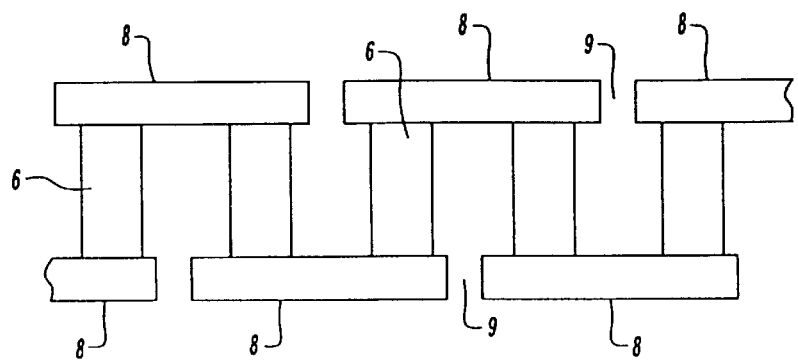
FIG. 3 is a similar enlarged view along lines 3—3 of inset A of FIG. 1, revealing details of an exterior portion of the same presently preferred embodiment of the oil control piston ring of this invention.

Referring initially to FIGS. 1, 2, and 3, the present invention provides an improved compression mechanism for a piston oil control ring. The mechanism is designed to optimize radial pressure of an engine piston ring juxtapositioned against an associated engine cylinder bore wall (not shown), particularly during the break-in period of an internal combustion engine (not shown). Thus, an annular piston oil control ring 2 is adapted to be used as a bottom scraper ring of a piston utilized in the engine. The oil control ring 2 includes a circumferentially arranged plurality of vertically slotted openings 4 (in the orientation displayed) that define vertically extending web segments 6. The segments 6 are oriented parallel to a centrally positioned, vertically oriented axis "a—a" of the control ring 2, depicted in FIG. 1.

Referring now particularly to FIGS. 2 and 3, a plurality of segmented rail portions 8 are integrally attached to the web segments 6 in the "broken-ladder" style of FIG. 3. The rail portions 8 extend radially outwardly of the web segments 6, and are thus orthogonal to the axis a-a. Collectively, the segmented rail portions 8 define radially extending gaps 9 between adjacent segments 8, as shown.

Those skilled in the art will appreciate that the slotted web segments 6 collectively form a substantially contiguous, circumferentially extending web portion 12, and that similarly the segmented rail portions 8 collectively form contiguous upper and lower circumferential rail portions 14 and 16, respectively. The web portion 12 and the rail portions 14 and 16 are coupled together in the broken-ladder arrangement so as to impart a high degree of flexibility to the respective piston ring parts in the cylinder bore environment in which they must satisfactorily operate.

Figure 4:
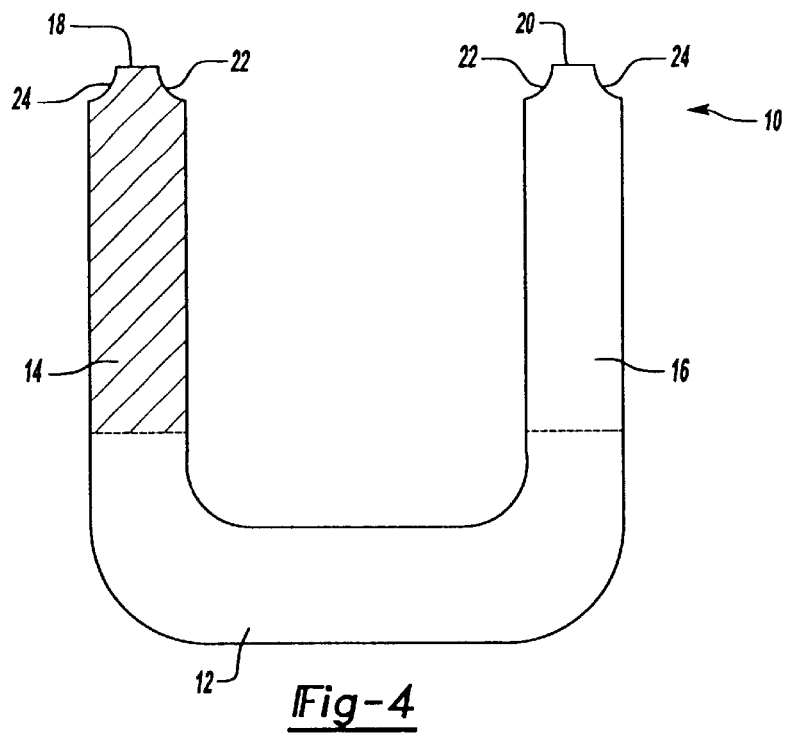
FIG. 4 is a cross-sectional view of the oil control piston ring of FIG. 1 along lines 4—4 of FIG. 1.

Referring now to FIG. 4, a U-shaped cross-section 10 of the piston ring 2 displays in greater detail the connective relationships and orientation between the web portion 12, and the rail portions 14 and 16 that extend radially outwardly of the axis a—a (of FIG. 1). The extremities of the rail portions 14 and 16 are defined by a pair of lands 18, 20 that are oriented parallel to the axis a—a, and are designed to directly engage and scrape the cylinder bore walls in a reciprocal manner, as the piston containing the oil control ring 2 reciprocates back and forth within a cylinder bore.

Figure 5:
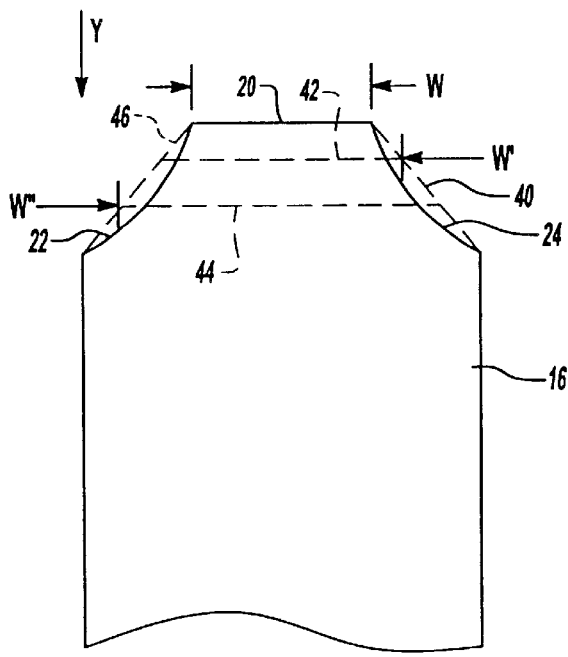
FIG. 5 is an enlarged fragmentary view of one rail portion of the U-shaped piston ring depicted in FIG. 4, highlighting the difference between a straight chamfered sidewall (shown in phantom) and the concave sidewall of the present invention.

Each land 18, 20 is flanked by an inner concave chamfered sidewall 22 and an outer concave chamfered sidewall 24, as shown. As illustrated in FIGS. 4–5. sidewalls 22 and 24 can be symmetrical about lands LB and 22. The concave chamfered sidewall 22 defines one annular groove about the ring 2. and the concave chamfered sidewall 24 defines another annular groove about the ring 2. Those skilled in the art will appreciate that each land 18, 20 provides a cylinder wall contact surface area that is ideally maintained so as not to become enlarged due to wear, particularly during the break-in period of an engine in which the oil control ring 2 is being utilized. Indeed, in order to maximize contact pressure between the so-called "knife edge" land surface of the piston oil control ring, the concave nature of the chamfered sidewall edges 22, 24 provides a mechanism by which the land surface area stays smaller particularly during the break-in period, than any land area of the prior art.

Referring now to FIG. 5, those skilled in the art will appreciate that the axial width dimension W of the lands 18, 20 should ideally be maintained as short as feasible in order to minimize the contact area during break-in; prior art straight angled chamfered sidewall edges 40, 46 are shown in phantom (via dotted lines) for comparison. During the break-in period, as wear occurs radially inwardly or along the "y" axis in the direction of the arrow shown, the worn width W' of the land 20 is representatively shown in phantom as land 42 after a first amount of wear has occurred in the straight chamfered prior art sidewall edges 40, 46. It will be apparent that the width W' of the land 42 will have become substantially wider after said first amount of wear, thus commensurately and undesirably increasing surface area in the straight angled chamfered sidewall edge. Indeed, the additionally increased width W'" of the land 44 (shown in phantom) represents a second or more extreme amount of wear along the radial direction of the "y" axis, and demonstrates that the width W'" becomes objectionably even greater.

Thus, those skilled in the art will appreciate that use of concave chamfered sidewall edges 22, 24 will provide a mechanism by which the land surface area stays smaller than otherwise possible, as demonstrated in FIG. 5.

Figure 6:
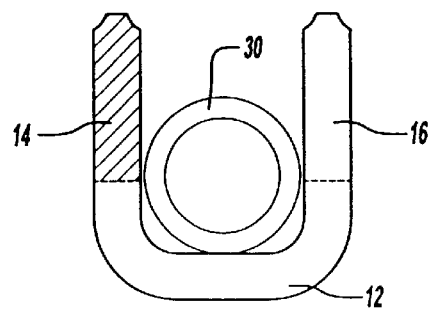
FIG. 6 is a cross-sectional view similar to the view of FIG. 4 of the oil control piston ring, but including a coil spring used to facilitate handling of the piston ring.

Finally, with particular reference to FIG. 6, a spring 30, preferably of the coil spring variety, is employed for handling an otherwise relatively flimsy annular oil control piston ring 2 of the present invention. The spring 30 imparts a relative rigidity to facilitate the handling and installation of the piston ring 2 into a piston during assembly of engine parts. To the extent that the piston ring 2 operates in an oily environment, both the ring 2 and the spring 30 may be made of a relatively inexpensive metal, such as carbon steel.

The above description is intended to be illustrative and not limiting. Therefore, the scope of the invention should be determined, however, not with reference to the above description, but with reference to the appended claims along with the full scope of equivalents to which such claims may be entitled.

What is claimed is:

1. An oil control ring for a piston of an internal combustion engine, said ring comprising an annular body defining a central axis, said ring having a U-shaped cross-section comprising a centrally positioned web extending parallel to said axis and a pair of axially spaced rail portions integrally coupled to said web, wherein each rail portion extends radially outwardly with respect to said web, an extremity of each rail portion defining a land extending parallel to said axis and adapted to sealingly engage a cylinder wall, each said land has an axial width dimension and a concave annular sidewall extending from each side of said land associated with said axial width dimension.

2. The oil control ring of claim 1 wherein said concave annular sidewall comprises an annular groove about the body of said ring.

3. The oil control ring of claim 2 wherein said web comprises a plurality of spaced web segments that define apertures for the flow of oil from the cylinder walls to piston oil return bores.

4. The oil control ring of claim 3 wherein said apertures are slotted, and wherein said slotted apertures are regularly spaced about said annular body of said piston ring, and wherein each of said slotted apertures extends into each rail at an edge of said rail.

5. The oil control ring of claim 4 wherein said web segments are circumferentially spaced about said annular body, and wherein each web segments extends parallel to said axis.

6. The oil control ring of claim 5 wherein said oil control ring provides a reduced land contact dimension to minimize oil consumption during the break-in period of an engine.

7. The oil control ring of claim 6 wherein said ring is a bottom scraper ring of a piston.

8. The oil control ring of claim 7 wherein said ring comprises a carbon steel material.

9. The oil control ring of claim 1 wherein said concave annular sidewalls are symmetrical about said land.

10. An oil control ring for a piston of an internal combustion engine, said ring comprising an annular body defining a central axis, said ring having a U-shaped cross-section comprising a centrally positioned web extending parallel to said axis and a pair of axially spaced rail portions integrally coupled to said web, wherein each rail portion extends radially outwardly with respect to said web, an extremity of each rail portion defining a land extending parallel to said axis and adapted to sealingly engage a cylinder wall, each said land has an axial width dimension and a concave annular sidewall extending from each side of said land associated with said axial width dimension wherein said ring further comprises an annular spring disposed between said rail portions to impart rigidity to the ring, and to thereby facilitate handling of said oil control ring.

11. The oil control ring of claim 10 wherein said annular spring is a coil spring.

12. The oil control ring of claim 10 wherein said concave annular sidewalls are symmetrical about said land.

13. An oil control ring for a piston of an internal combustion engine, said ring comprising an annular body defining a central axis, said ring having a U-shaped cross-section comprising a centrally positioned web extending parallel to said axis and a pair of axially spaced rail portions integrally coupled to said web, wherein each rail portion extends radially outwardly with respect to said web, an extremity of each rail portion defining a land extending parallel to said axis and adapted to sealingly engage a cylinder wall, each said land has an axial width dimension and a concave annular sidewall extending symmetrically from each side of said land associated with said axial width dimension wherein said concave annular sidewall comprises an annular groove flanking said land about the body of said ring, and wherein said ring further comprises an annular spring disposed within said ring, said spring situated between said rail portions and immediately adjacent said web.

14. The oil control ring of claim 13 wherein each of said ring and said annular spring disposed within said ring comprises a carbon steel material.

* * * * *